(No Model.)
G. E. RAYMOND.
WIRE EGG CASE.
No. 433,925.            Patented Aug. 5, 1890.
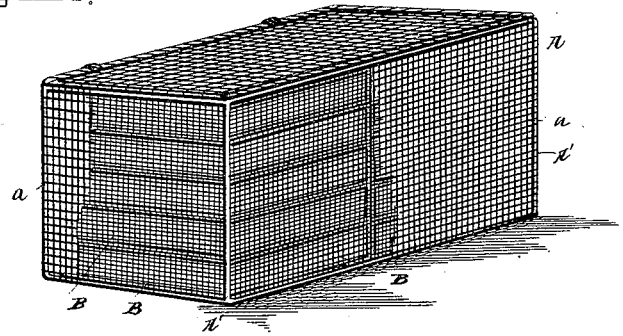
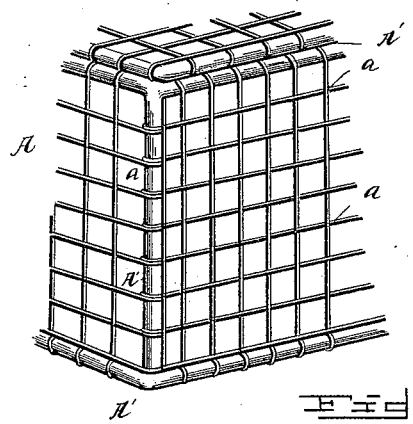
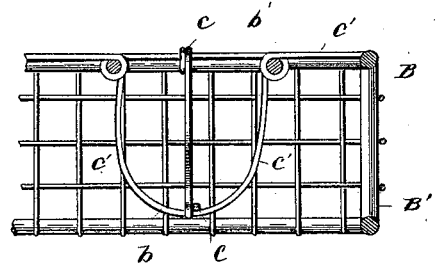
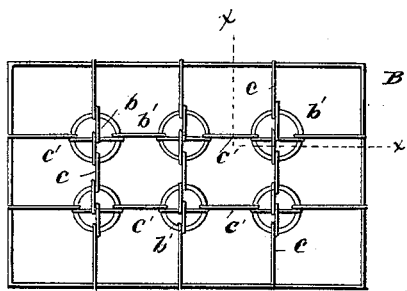
Witnesses
Paul W. Stevens
A. M. Speer
Inventor
George E. Raymond,
By Myers & Co
Attorneys.
THE NORRIS PETERS CO., PHOTO-LITHO., WASHINGTON, D. C.

UNITED STATES PATENT OFFICE.

GEORGE EDWARD RAYMOND, OF CHICAGO, ILLINOIS.

WIRE EGG-CASE.

SPECIFICATION forming part of Letters Patent No. 433,925, dated August 5, 1890.

Application filed October 19, 1889. Serial No. 327,507. (No model.)

*To all whom it may concern:*

Be it known that I, GEORGE EDWARD RAYMOND, a citizen of the United States of America, residing at Chicago, in the county of Cook and State of Illinois, have invented certain new and useful Improvements in Wire Egg-Cases, of which the following is a specification, reference being had therein to the accompanying drawings.

My invention pertains to an improvement in wire-woven egg-cases, having for its object the preservation of eggs in warm weather by maintaining them at atmospheric or minimum temperature, especially during transit or shipment, by means of the air which is allowed to circulate through the meshes of the case and trays, and also for preserving them from breakage in shipment and transshipment; and it consists in the peculiar structure, arrangement, and combination of the parts, as hereinafter more fully described, and shown in the accompanying drawings, in which—

Figure 1 is a perspective view of my egg-case complete, parts being broken away. Fig. 2 is a detail view of one corner thereof, showing more particularly the manner in which the wire is woven. Fig. 3 is a detail sectional view of one end of an egg-case, taken through the line *x x* of Fig. 4. Fig. 4 is a plan view of one of the egg-carriers.

In the embodiment of my invention I employ a wire-woven box or case A, having its edges formed of a frame of stout metal or wire A', about which frame is woven a wire cover, each strand of wire being wound securely about said frame, as at *a*, thus forming a strong case or receptacle. The box or case A has a wire-woven or perforated cover hinged at its rear side.

Egg trays or carriers B are formed of woven wire and have openings or recesses *b'* in the upper side, into which the eggs are to be placed, and recesses or pockets *b* are formed of two strands of wire *c c'*, projecting down about vertically to form a semi-ellipse, and are secured at their point of crossing, said wires running transversely, as shown.

The egg-trays B consist of rectangular frames B', of heavy wire, having wire-woven sides and upper face, from which upper face depend pockets extending vertically downward therefrom nearly the whole height of said trays, as shown in Fig. 1. It will thus be seen that by disposing the eggs in the pockets *b* and placing the trays or carriers one above the other in the case A the danger of breaking the eggs is largely obviated.

I do not confine myself to any special design of woven wire, as the same may be woven in any ordinary manner without departing from the spirit of my invention, and perforated metal may be used in lieu of woven wire.

Having thus fully described my invention, what I claim, and desire to secure by Letters Patent, is—

1. A wire-woven egg-case having the series of superposed trays, each tray consisting of a rectangular frame having wire woven thereabout on its sides and upper face and wire-woven pockets depending vertically from said upper face, substantially as shown and described.

2. In a wire-woven egg-case, the trays formed of a rectangular frame having wire woven thereabout, said trays having openings in their upper faces, from which depend pockets formed of two transverse strands of wire bent to form a semi-ellipse and secured at their crossing point at the bottom of said pockets, substantially as shown and described.

In testimony whereof I affix my signature, in presence of two witnesses.

GEORGE EDWARD RAYMOND.

Witnesses:
   J. M. LYNCH,
   J. H. INGWERSEN.